(12) United States Patent
Sawatzki et al.

(10) Patent No.: US 10,862,086 B2
(45) Date of Patent: Dec. 8, 2020

(54) BATTERY FOR ELECTRIFIED VEHICLE INCLUDING COMPRESSIBLE BATTERY MODULES WITH MOVEABLE BATTERY ARRAYS

(71) Applicant: Ford Global Technologies, LLC, Dearborn, MI (US)

(72) Inventors: Marius Sawatzki, Pulheim (DE); Daniel Meckenstock, Wuppertal (DE)

(73) Assignee: FORD GLOBAL TECHNOLOGIES, LLC, Dearborn, MI (US)

(*) Notice: Subject to any disclaimer, the term of this patent is extended or adjusted under 35 U.S.C. 154(b) by 49 days.

(21) Appl. No.: 16/375,993

(22) Filed: Apr. 5, 2019

(65) Prior Publication Data

US 2019/0319233 A1 Oct. 17, 2019

(30) Foreign Application Priority Data

Apr. 13, 2018 (DE) .................... 10 2018 205 627

(51) Int. Cl.
*H01M 4/02* (2006.01)
*H01M 2/10* (2006.01)
*B60L 50/64* (2019.01)
*B60K 1/04* (2019.01)

(52) U.S. Cl.
CPC ............. *H01M 2/1077* (2013.01); *B60K 1/04* (2013.01); *B60L 50/64* (2019.02); *H01M 2/1094* (2013.01); *B60K 2001/0438* (2013.01); *B60Y 2306/01* (2013.01); *H01M 2220/20* (2013.01)

(58) Field of Classification Search
CPC ....................................................... H01M 4/02
See application file for complete search history.

(56) References Cited

U.S. PATENT DOCUMENTS 9,412,984 B2 8/2016 Fritz et al.
2012/0261206 A1 10/2012 Yasui et al.

FOREIGN PATENT DOCUMENTS

DE 10-2009-040598 * 3/2011
DE 102009040598 A1 3/2011

* cited by examiner

*Primary Examiner* — Jacob B Marks
(74) *Attorney, Agent, or Firm* — David B. Kelley; Carlson, Gaskey & Olds, P.C.

(57) ABSTRACT

A battery for an electrified vehicle according to an exemplary aspect of this disclosure includes, among other things, a battery housing, a battery module within the battery housing and extending in a transverse direction of the electrified vehicle, a plurality of battery arrays arranged within the battery module, the battery arrays arranged in a floating manner within the battery module, and a plurality of deformable supports, some of which are arranged in transverse spaces between adjacent ones of the plurality of battery arrays.

19 Claims, 4 Drawing Sheets

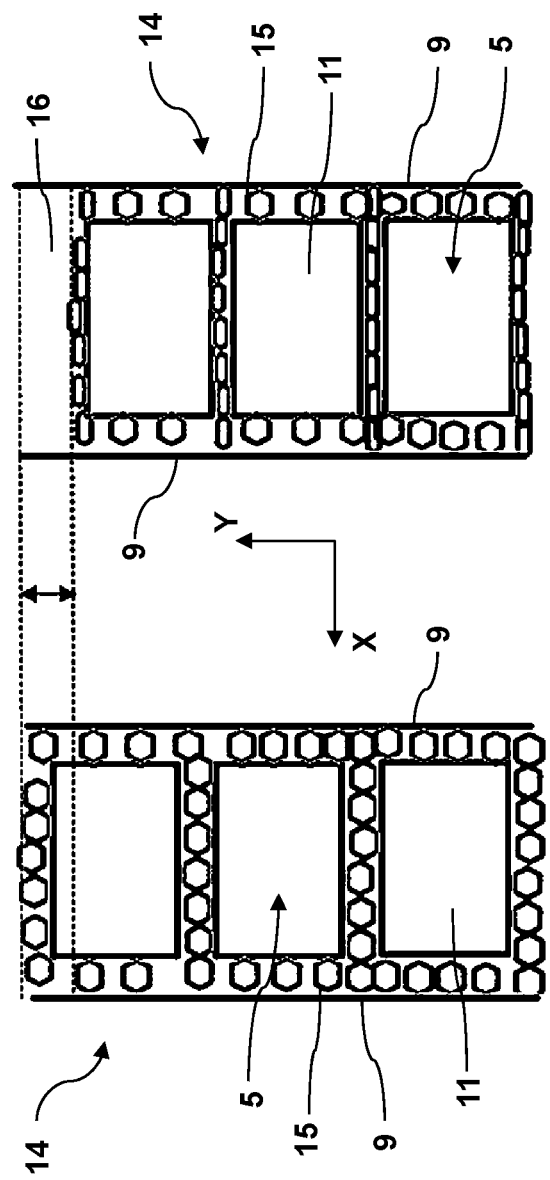

BATTERY FOR ELECTRIFIED VEHICLE INCLUDING COMPRESSIBLE BATTERY MODULES WITH MOVEABLE BATTERY ARRAYS

RELATED APPLICATION(S)

This application claims priority to German Patent Application No. 102018205627.7, filed on Apr. 13, 2018, the entirety of which is herein incorporated by reference.

TECHNICAL FIELD

This disclosure relates to a battery for an electrified vehicle. In particular, the battery includes compressible battery modules with movable battery arrays.

BACKGROUND

Electrified vehicles differ from conventional motor vehicles because electrified vehicles are selectively driven using one or more electric machines powered by a traction battery. The electric machines can drive the electrified vehicles instead of, or in addition to, an internal combustion engine. Example electrified vehicles include hybrid electric vehicles (HEVs), plug-in hybrid electric vehicles (PHEVs), fuel cell vehicles (FCVs), and battery electric vehicles (BEVs). The traction battery is a relatively high-voltage battery that selectively powers the electric machines, and potentially other electrical loads of the electrified vehicle. The traction battery can include battery arrays each including a plurality of interconnected battery cells that store energy.

An example known tractions battery is shown in DE 10 2009 040 598 A1. The '598 DE reference discloses a battery module with a plurality of battery packs, each having a plurality of individual cells, and arranged substantially in a closed housing. The battery module has at least one element that absorbs impact energy within the housing, and at least one additional elements that absorbs impacts energy arranged between the battery packs.

In another known arrangement, specifically that of U.S. 2012/0261206 A1, a battery block has a shock-absorbing element for absorbing an impact force without increasing the overall size of the battery module. The battery block has a receiving portion, which accommodates a number of cells that serve as secondary batteries. An exhaust-gas outlet has a shock-absorbing element that, in the event of an impact, deforms to reduce the space of the outlet channel and to absorb impact energy.

In yet another known arrangement, U.S. Pat. No. 9,412,984 B2 discloses a motor vehicle battery having at least one battery module, which has a plurality of battery cells that are bounded by battery module walls. Two opposite battery module walls of the battery module are located between walls of a battery housing or walls of a bodywork structure. Deformation elements fasten the battery module walls of the respective battery module indirectly to walls of the battery housing or of the bodywork structure, and the respective wall of the battery housing or of the bodywork structure.

SUMMARY

A battery for an electrified vehicle according to an exemplary aspect of this disclosure includes, among other things, a battery housing, a battery module within the battery housing and extending in a transverse direction of the electrified vehicle, a plurality of battery arrays arranged within the battery module, the battery arrays arranged in a floating manner within the battery module, and a plurality of deformable supports, some of which are arranged in transverse spaces between adjacent ones of the plurality of battery arrays.

In a further non-limiting embodiment of the foregoing battery, at least some of the deformable supports are arranged in transverse spaces between the battery housing and an adjacent battery array.

In a further non-limiting embodiment of any of the foregoing batteries, the deformable supports are one of plastically deformable and elastically deformable.

In a further non-limiting embodiment of any of the foregoing batteries, the deformable supports are made of foamed or non-foamed plastic.

In a further non-limiting embodiment of any of the foregoing batteries, the battery modules is bound longitudinally by transverse members, and at least some of the deformable supports are arranged in longitudinal spaces between the battery modules and the transverse members.

In a further non-limiting embodiment of any of the foregoing batteries, the transverse members are connected at respective ends thereof directly to the battery housing.

In a further non-limiting embodiment of any of the foregoing batteries, central portions of the transverse members have a greater strength than ends of the transverse members.

In a further non-limiting embodiment of any of the foregoing batteries, each transverse member is connected to the battery housing at respective ends thereof by way of longitudinal members having lesser strength than the transverse members.

In a further non-limiting embodiment of any of the foregoing batteries, the deformable supports at least partially define a channel configured to direct thermal exchange fluid therethrough.

In a further non-limiting embodiment of any of the foregoing batteries, the deformable supports are formed from individual sub-units that are loosely held together.

In a further non-limiting embodiment of any of the foregoing batteries, the battery includes electrical terminal connections between the adjacent battery arrays, and the electrical terminal connections are to separate from one another when the battery is in a collision state.

In a further non-limiting embodiment of any of the foregoing batteries, the electrical terminal connections are configured to retract into a housing of a respective battery array when the battery is in the collision state.

In a further non-limiting embodiment of any of the foregoing batteries, each of the plurality of battery arrays includes a plurality of battery cells.

In a further non-limiting embodiment of any of the foregoing batteries, the battery array includes at least one additional battery module within the battery housing.

A method according to an exemplary aspect of the present disclosure includes, among other things, absorbing a force applied to a battery with deformable supports arranged in transverse spaces between adjacent battery arrays.

In a further non-limiting embodiment of the foregoing method, the force is also absorbed by deformable supports arranged in transverse spaces between a battery housing and an adjacent battery array.

In a further non-limiting embodiment of any of the foregoing methods, absorbing the force include deforming the deformable supports plastically or elastically.

In a further non-limiting embodiment of any of the foregoing methods, the force is also absorbed by deformable supports arranged in longitudinal spaces between a transverse member and an adjacent battery array.

In a further non-limiting embodiment of any of the foregoing methods, the method includes, following the applied force, separating electrical terminal connections between the adjacent battery arrays.

In a further non-limiting embodiment of any of the foregoing methods, the method includes, following separation of the electrical terminal connections, retracting the electrical terminal connections into a housing of a respective battery array.

BRIEF DESCRIPTION OF THE DRAWINGS

In FIG. 1, the battery array is in a first collision state.

In FIG. 2, the battery array is in a second collision state.

FIG. 3A is a schematic representation of a battery module in a normal state.

FIG. 3B is a schematic representation of the battery module shown in FIG. 3A in a collision state.

DETAILED DESCRIPTION

Figure 1:
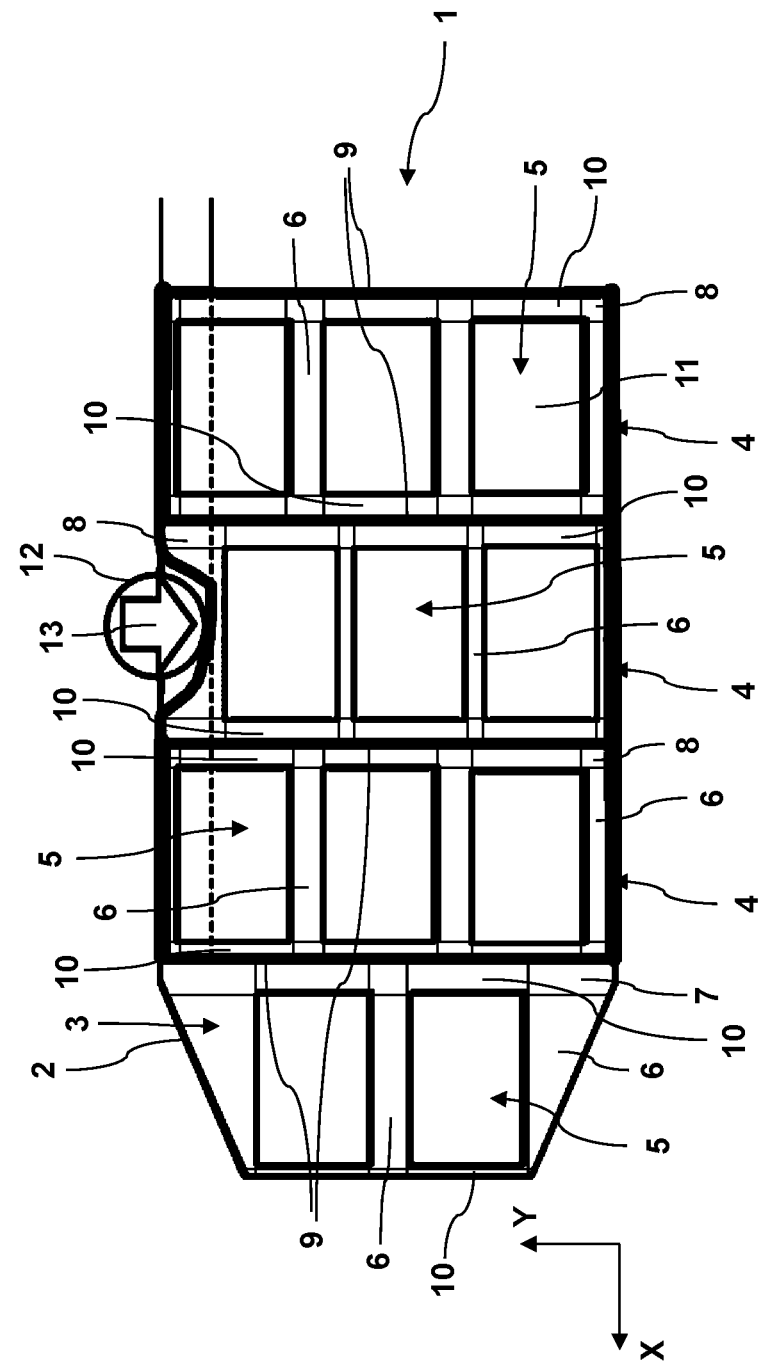
FIG. 1 schematically illustrates an example battery array from a top view.

This disclosure relates to a battery for an electrified vehicle. In particular, the battery includes a battery housing, a battery module within the battery housing and extending in a transverse direction of the electrified vehicle, a plurality of battery arrays arranged within the battery module, the battery arrays arranged in a floating manner within the battery module, and a plurality of deformable supports, some of which are arranged in transverse spaces between adjacent ones of the plurality of battery arrays. Accordingly, this disclosure increases safety, especially in the context of a side impact, while saving space and increasing the weight of the vehicle. These and other benefits will be appreciated from the following description.

According to this disclosure, in the case of collision forces of a certain order of magnitude acting laterally upon the high-voltage battery (i.e., forces acting in the vehicle transverse direction y), there is a deformation of a lateral housing portion of the battery housing, without the battery arrays being displaced laterally within the battery housing. In this case forces are transmitted from the housing portion to the support that is in contact therewith, forces are transmitted to the battery array that is nearest in the vehicle transverse direction. Finally, forces are transmitted from a further battery array that is located on the outside in the vehicle transverse direction, via a support, to the battery housing, or to the further longitudinal member.

As a result of the forces acting upon the supports, the supports may be deformed elastically and/or plastically, as a result of which the battery arrays are moved away, or displaced, from the deformed housing portion of the battery housing by a certain amount. As a result, a greater space is made available for absorption of collision forces on the side on which force acts upon the battery housing. At the same time, the battery arrays are moved out of this space, and are thus better protected against contact with the deformed housing portion, as a result of which at least the battery array closest to the deformed housing portion could otherwise be damaged. In this disclosure, the battery modules need not have a strong, or robust, module housing. It is even possible to dispense entirely with a conventional module housing, which saves on both weight and cost.

Further, the battery arrays that are arranged next to each other in the vehicle transverse direction are arranged in a floating manner (i.e., not rigidly fixed) in the battery housing, which means that in the vehicle transverse direction the battery arrays are not additionally secured to the battery housing by other means, for example by positive engagements or mechanical coupling means.

The elastically and/or plastically deformable supports may be produced from metallic or non-metallic materials. The respective support may be air-permeable. Preferably, the supports are produced from an electrically insulating material. An elastic deformability renders possible re-use of the supports, and can ensure an optimal surface contact between the respective support and the respective battery array, such that, in the event of a collision, a housing of the battery array is not subjected to loads acting at localized points. A plastic deformability enables collision forces to be absorbed by means of the supports. Preferably, the supports serve to hold the battery arrays aligned in a row during their lateral movement in the vehicle transverse direction, in order to prevent individual battery arrays from tilting, or twisting, relative to each other during the lateral movement. In addition, the supports may serve to dissipate collision energy, in order to relieve load on the battery arrays in the event of collision.

The battery housing is configured so as to be deformable, in particular at its housing portions that are opposite one other in the vehicle transverse direction. The battery housing may be fixed to or at least partly in a vehicle floor of the motor vehicle. A protective structure, which provides a high level of plastic deformation, is compressible protection for loads, and as a result can absorb collision energy, and may be arranged around the battery housing. As a result, reduced forces are transmitted to the battery housing. The longitudinal members that may possibly be arranged on the battery housing enable load to be transmitted in the vehicle transverse direction.

Further, each battery array has a housing, which has a greater strength than the respective support. The battery cells of the respective battery array may be, for example, lithium-ion battery cells.

The high-voltage battery may be, in particular, a traction battery of an electrified vehicle, in particular an electric vehicle or a hybrid electric vehicle. The high-voltage battery may have more than two battery modules.

According to one embodiment, the supports are formed, at least partly, from a foamed or non-foamed plastic. The foamed plastic may be realized so as to be rigid or elastically deformable. A support made of a foamed plastic has a relatively low weight.

In a further embodiment, the battery housing includes at least one receiving chamber, in which battery arrays that are arranged next to one other in the vehicle transverse direction are arranged, and which is bounded at the front and the rear by a respective transverse member extending in the vehicle transverse direction. The transverse members are connected at an end to the battery housing, or to longitudinal members. The battery arrays that are arranged in the receiving chamber are arranged at a distance from the transverse members, and there is at least one support between the battery arrays and the respective transverse member. The transverse members have a greater strength than the supports. Thus, the battery arrays of a battery module are supported on the transverse members, in the vehicle transverse direction, via the supports. The receiving chamber is simultaneously the receiving chamber of a battery module. A plurality of such receiving chambers, having supports and battery arrays arranged therein, may also be arranged within the battery housing. The transverse members may be realized as a profile, or may be flat, as a wall element. Receiving chambers arranged adjacently to each other may be separated from each other by a single transverse member. The transverse members assigned to a receiving chamber form, to a certain extent, a housing portion of a module housing of the respective battery module. The transverse members may absorb collision forces occurring in the vehicle transverse direction. For this purpose, the transverse members may be realized so as to be plastically deformable, at least partially.

According to a further embodiment, a central portion of the respective transverse member has a greater strength than the end portions of the transverse member. Specifically, each transverse member is connected at an end, via a respective connection element, to the battery housing, or to the longitudinal members, which have a lesser strength than the transverse member. As a result, the end portions, or the connection elements, may be used as portions for absorbing collision forces. On the other hand, the central portions of the transverse members, or the entire transverse members, may be realized so as to be of such a stiffness that they do not become deformed in the event of a collision. The length of the central portions of the transverse members, or of the entire transverse members, in this case is dimensioned in such a manner that the portions, or the entire transverse members, are longer than the sum of the dimensions of the individual battery arrays in the vehicle transverse direction.

According to a further embodiment, there is at least one cooling channel, through which a cooling medium can flow, on at least one support. For this purpose, there may be at least one through-hole, or passage opening, on the respective support. Thermal conditioning (e.g., cooling) of the battery arrays may be effected by means of the cooling medium. Mutually adjoining supports may have cooling channels that are in alignment with each other, in order to realize longer cooling lines, which may be connected to a cooling-medium supply, for example to a fan. The cooling medium may be gaseous, in particular air, or liquid, in particular water.

A further embodiment provides that at least one support is formed from individual sub-units that are loosely or fixedly connected to each other. In the former instance, it is possible to provide a modular structure of the respective support, enabling it to be easily adapted to differing structural spaces. It is therefore not necessary to produce and store differing supports for differing designs of high-voltage battery, which reduces production costs.

According to an embodiment, high-voltage terminal connections of the battery arrays are realized in such a manner that, in the case of a displacement of the battery arrays in the vehicle transverse direction, mutually connected high-voltage terminal connections of battery arrays that are arranged next to each other in the vehicle transverse direction, and/or high-voltage terminal connections of the battery arrays that are connected to at least one further battery component, are automatically separated from each other, or from the further battery component. Further, each battery array may have at least one safety unit, which is configured to automatically displace a high-voltage terminal connection of the battery array following its separation from a high-voltage terminal connection of a further battery array, or from the further battery component, into a housing of the battery array. As a result of the electrical separation of the battery arrays from each other and from other electrically conductive battery components, and the protected arrangement of the high-voltage terminal connections within the housing of the battery arrays, the high-voltage terminal connections cannot come into contact with each other and with another structural part of the high-voltage battery and of the motor vehicle. This makes it possible reliably to prevent a high-voltage short circuit from being generated, or a high-voltage current from flowing through an electrically conductive structural part of the motor vehicle, during or after a collision of the motor vehicle with an object.

In general, relative to the figures, parts that are the same are denoted by the same reference numbers, and such parts are normally also described only once.

FIG. 1 shows a schematic representation of an exemplary embodiment of a battery 1 ("battery 1") according to this disclosure for an electrically drivable motor vehicle, not shown, in a collision state. For reference, the transverse and longitudinal directions are the "y" and "x" directions, respectively, in FIG. 1.

The battery 1 has a deformable battery housing 2, the front region of which, shown on the left in FIG. 1, is tapered. Furthermore, the battery 1 has four battery modules 3, 4 arranged in the battery housing 2. The battery module 3 has two battery arrays 5, and each battery module 4 has three battery arrays 5. The battery arrays 5 include arrays of individual battery cells. While a particular number of battery arrays 5 and battery modules 3, 4 are shown in FIG. 1, it should be understood that this disclosure extends to different arrangements including a different number or configuration of the battery arrays 5 and battery modules 3, 4.

In the example of FIG. 1, the battery modules 3, 4 are arranged such that their length dimensions are arranged in the transverse direction y. The battery modules 3, 4 are also arranged one-behind-the-other relative to the longitudinal direction x. The battery arrays 5 of each battery module 3, 4 are arranged aligned relative to one other in the transverse direction y and are spaced-apart from the battery housing 2. The battery arrays 5 of each battery module 3, 4 that are arranged next to each other in the transverse direction y are arranged in a floating manner in the battery housing 2 in the transverse direction y. The term "floating manner" means that the battery arrays 5 are not rigidly fixed within the battery module 3, 4 and are configured to move relative to one another within the battery module 3, 4, especially in a collision state.

In this disclosure, there is at least one support 6, which is elastically and/or plastically deformable arranged between some of the arrays 5. In a particular example, supports 6 are arranged in the transverse spaces between each array 5, and further in the transverse spaces between each array 5 and the battery housing 2. Each support 6 may be formed, at least partly, from a foamed or non-foamed plastic. At least one cooling channel, not shown, through which a cooling medium can flow may be realized on at least one support 6. At least one support 6 may be formed from individual sub-units, not shown, that are loosely or fixedly connected to each other.

Further, there are four receiving chambers 7, 8 within the battery housing 2 in this disclosure. The receiving chambers 7, 8 extend in the transverse direction y and separate the arrays 5 of adjacent battery modules 3, 4 in the longitudinal direction x. The receiving chambers 8 are bounded at the front and rear by a respective transverse member 9, extending in the transverse direction y, which is connected at one end to the battery housing 2 or to the longitudinal members, not shown. The battery arrays 5 arranged in the respective receiving chamber 7, 8 are spaced-apart from the transverse members 9. Arranged between the battery arrays 5 and the respective transverse members 9, there is at least one elastically and/or plastically deformable support 10, which the battery arrays 5 are supported on in the transverse direction y.

The transverse members 9 have a greater strength than the supports 10. A central portion of the respective transverse member 9 may have a greater strength than end portions of the transverse member 9. Alternatively, each transverse member 9 may be connected at an end, via a respective connection element, not shown, to the battery housing 2 or to the longitudinal members, which has a greater strength than the transverse member 9.

High-voltage terminal connections, not shown, of the battery arrays 5 may be realized in such a manner that, in the case of a displacement of the battery arrays 5 in the transverse direction y, mutually connected high-voltage terminal connections of battery arrays 5 that are arranged next to each other in the transverse direction y, and/or high-voltage terminal connections of the battery arrays 5 that are connected to at least one further battery component, not shown, are automatically separated from each other, or from the further battery component.

Each battery array 5 may have at least one safety unit, not shown, which is configured to automatically displace a high-voltage terminal connection of the battery array 5, following its separation from a high-voltage terminal connection of a further battery array 5, or from the further battery component, into a housing 11 of the battery array 5.

In the collision state shown in FIG. 1, an object 12 has penetrated laterally into the battery 1, as shown by the arrow 13. The battery housing 2 in this case has undergone lateral deformation. In this case, the battery arrays 5 of the central battery module 4, together with the supports 6 (arranged in-between the battery arrays and between the outer battery arrays 5 and the battery housing 2), have been displaced in the transverse direction y. The supports 6 having been deformed elastically and/or plastically. As a result, the battery housing 2 can deform, as shown in FIG. 1, without damage being incurred by the battery arrays 5.

Figure 2:
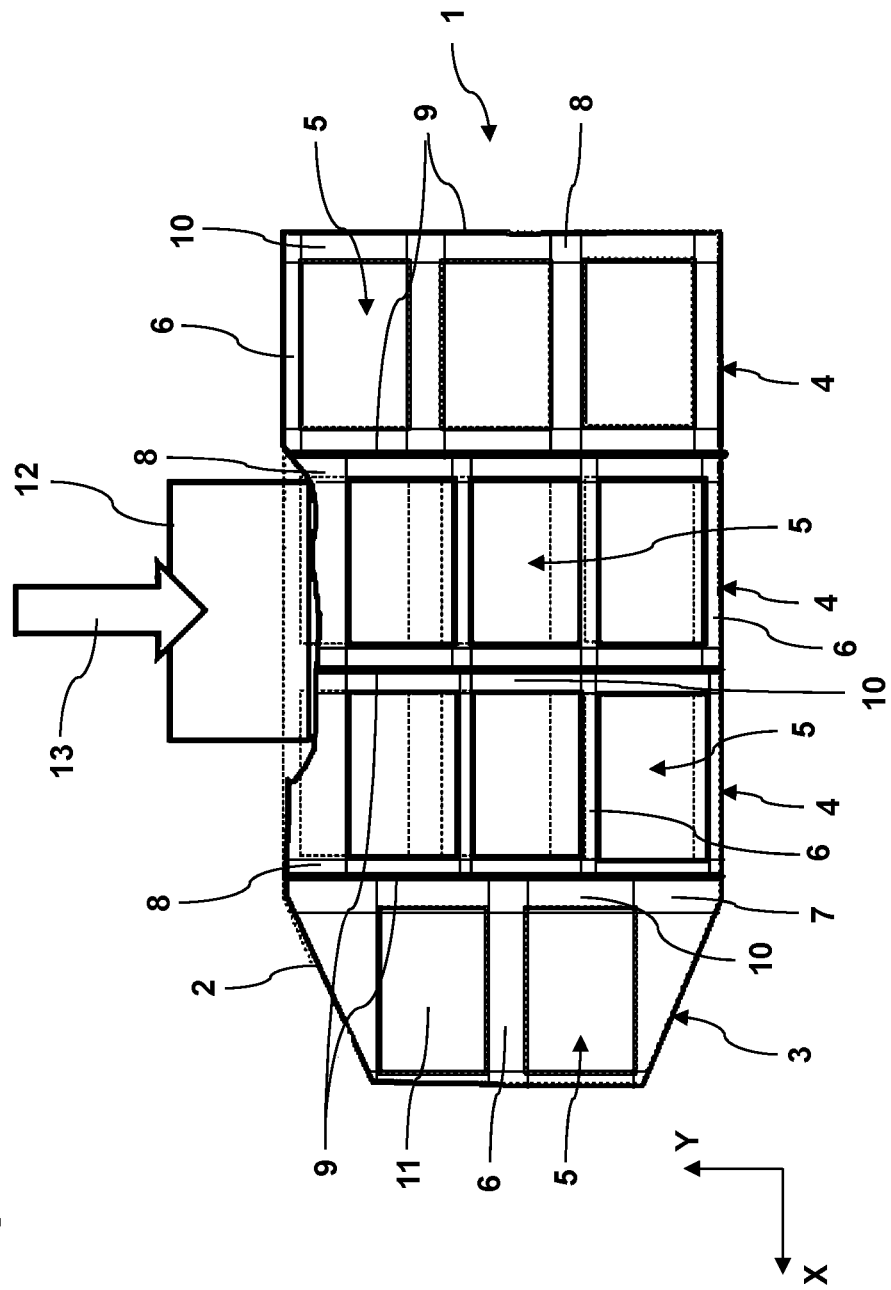
FIG. 2 schematically illustrates an example battery array from a top view.

FIG. 2 is a schematic representation of another collision state of the battery 1. In comparison with FIG. 1, a larger object has penetrated into the battery 1, as a result of which the battery arrays 5 of the central battery module 4 and of the battery module 4 arranged in front of it, together with the respective supports 6, have been displaced in the transverse direction y. The supports 6 have been deformed elastically and/or plastically, thereby protecting the battery arrays 5.

FIG. 3A is a schematic representation of a battery module 4 of a further exemplary embodiment for a battery 14 in a normal state. The battery 14 may be the same battery as shown in FIGS. 1 and 2.

In the case of the battery 14, the supports 6 are each formed from individual sub-units 15 that are loosely connected to each other. In particular, the space between the battery arrays 5, on the one hand, and the transverse members 9 and the battery housing or the longitudinal members arranged thereon, on the other hand, is uniformly filled with sub-units 15. The supports 6 shown in FIGS. 1 and 2 may be formed accordingly.

FIG. 3B is a schematic representation of the battery module 4 shown in FIG. 3A, in a collision state. The sub-units 15 have been elastically and/or plastically deformed, as a result of which the battery arrays 5 have been displaced in the transverse direction y. As a result, an additional space 16 has been released, into which the battery housing, or the longitudinal members, can be deformed, in order to absorb collision energy without the battery arrays 5 being damaged.

Figure 4B:
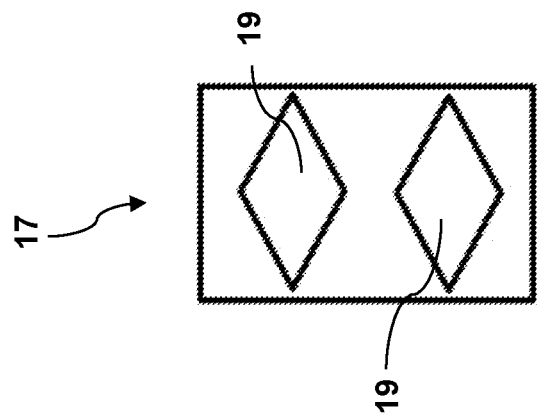
FIG. 4B is a schematic front view of the sub-unit shown in FIG. 4A.
Figure 4A:
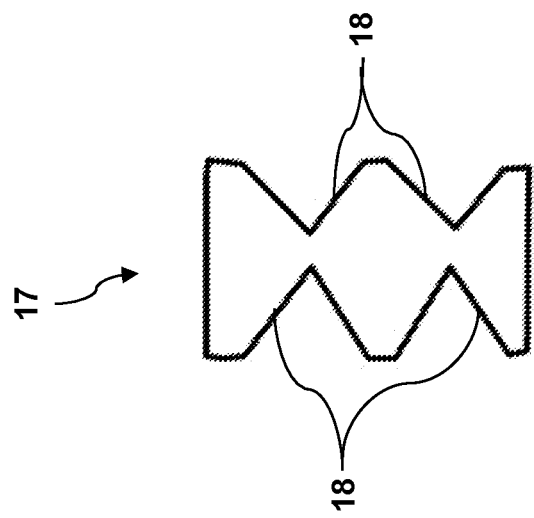
FIG. 4A is a schematic side view of a sub-unit of a support.

FIG. 4A is a schematic side view of a sub-unit 17 of a support 6 of a further exemplary embodiment for a battery. The battery may be realized according to the embodiments of FIGS. 1-3B. At the front and rear, the sub-unit 17 has, respectively, two recesses 18, through which the cooling channel portions, shown in FIG. 4B, extend.

FIG. 4B is a schematic front view of the sub-unit 17 shown in FIG. 4A. FIG. 4B illustrates the cooling channel portions 19 of the sub-unit 17, which serve to realize a cooling channel, not shown, through which a cooling medium can flow for the purpose of cooling the battery arrays 5.

Directional terms such as "fore," "aft," "transverse," "longitudinal," "vertical," "front," "rear," "side," etc., are used herein with reference to the normal operational attitude of a motor vehicle. It should be understood that terms such as "generally," "substantially," and "about" are not intended to be boundaryless terms, and should be interpreted consistent with the way one skilled in the art would interpret those terms.

Although the different examples have the specific components shown in the illustrations, embodiments of this disclosure are not limited to those particular combinations. It is possible to use some of the components or features from one of the examples in combination with features or components from another one of the examples. In addition, the various figures accompanying this disclosure are not necessarily to scale, and some features may be exaggerated or minimized to show certain details of a particular component or arrangement.

One of ordinary skill in this art would understand that the above-described embodiments are exemplary and non-limiting. That is, modifications of this disclosure would come within the scope of the claims. Accordingly, the following claims should be studied to determine their true scope and content.

The invention claimed is:

1. A battery for an electrified vehicle, comprising:
  a battery housing;
  a battery module within the battery housing and extending in a transverse direction of the electrified vehicle;
  a plurality of battery arrays arranged within the battery module, the battery arrays arranged in a floating manner within the battery module; and
  a plurality of deformable supports, wherein at least some of the deformable supports are arranged in transverse spaces between adjacent ones of the plurality of battery arrays.

2. The battery as recited in claim 1, wherein at least some of the deformable supports are arranged in transverse spaces between the battery housing and an adjacent battery array.

3. The battery as recited in claim 1, wherein the deformable supports are one of plastically deformable and elastically deformable.

4. The battery as recited in claim 3, wherein the deformable supports are made of foamed or non-foamed plastic.

5. The battery as recited in claim 1, wherein:
  the battery modules is bound longitudinally by transverse members, and at least some of the deformable supports are arranged in longitudinal spaces between the battery modules and the transverse members.

6. The battery as recited in claim 5, wherein the transverse members are connected at respective ends thereof directly to the battery housing.

7. The battery as recited in claim 6, wherein central portions of the transverse members have a greater strength than ends of the transverse members.

8. The battery as recited in claim 5, wherein each transverse member is connected to the battery housing at respective ends thereof by way of longitudinal members having lesser strength than the transverse members.

9. The battery as recited in claim 1, wherein the deformable supports at least partially define a channel configured to direct thermal exchange fluid therethrough.

10. The battery as recited in claim 1, wherein the deformable supports are formed from individual sub-units that are loosely held together.

11. The battery as recited in claim 1, further comprising electrical terminal connections between the adjacent battery arrays, wherein the electrical terminal connections are to separate from one another when the battery is in a collision state.

12. The battery as recited in claim 11, wherein the electrical terminal connections are configured to retract into a housing of a respective battery array when the battery is in the collision state.

13. The battery as recited in claim 1, wherein each of the plurality of battery arrays includes a plurality of battery cells.

14. The battery as recited in claim 1, wherein the battery array includes at least one additional battery module within the battery housing.

15. A method, comprising:
absorbing a force applied to a battery with deformable supports arranged in transverse spaces between adjacent battery arrays; and
following the applied force, separating electrical terminal connections between the adjacent battery arrays.

16. The method as recited in claim 15, wherein the force is also absorbed by deformable supports arranged in transverse spaces between a battery housing and an adjacent battery array.

17. The method as recited in claim 15, wherein absorbing the force include deforming the deformable supports plastically or elastically.

18. The method as recited in claim 15, wherein the force is also absorbed by deformable supports arranged in longitudinal spaces between a transverse member and an adjacent battery array.

19. The method as recited in claim 15, further comprising:
following separation of the electrical terminal connections, retracting the electrical terminal connections into a housing of a respective battery array.

* * * * *